United States Patent [19]

Schmitz

[11] Patent Number: 4,656,888
[45] Date of Patent: Apr. 14, 1987

[54] APPARATUS FOR VERTICAL AND AXIAL ADJUSTMENT OF A STEERING WHEEL

[75] Inventor: Axel Schmitz, Dusseldorf, Fed. Rep. of Germany

[73] Assignee: Kloeckner-Humboldt-Deutz AG, Cologne, Fed. Rep. of Germany

[21] Appl. No.: 841,581

[22] Filed: Mar. 20, 1986

[30] Foreign Application Priority Data

Mar. 22, 1985 [DE] Fed. Rep. of Germany ....... 3510311

[51] Int. Cl.⁴ .......................... B62D 1/18; G05G 5/06
[52] U.S. Cl. ........................................ 74/493; 74/531; 280/775
[58] Field of Search ................... 74/493, 531; 280/775

[56] References Cited

U.S. PATENT DOCUMENTS

| | | | |
|---|---|---|---|
| 4,041,796 | 8/1977 | Shishido | 74/531 X |
| 4,300,407 | 11/1981 | Köpf | 74/531 X |
| 4,307,626 | 12/1981 | Yamaguchi | 74/493 |
| 4,449,419 | 5/1984 | Bruguera | 74/493 |

FOREIGN PATENT DOCUMENTS 2116496  9/1983  United Kingdom ................. 74/493

Primary Examiner—Cornelius J. Husar
Assistant Examiner—Nancy J. Stodola
Attorney, Agent, or Firm—Charles L. Schwab

[57] ABSTRACT

An adjustable steering wheel apparatus with a hydraulic steering control unit (3) mounted on a bracket (9) or adjustment in the axial direction of the steering column (3) and also about the horizontal axis of aligned pins (14, 15). A locking means including links (21, 22), friction washers (27) and a clamping bolt (24) are provided to releasably secure the steering assembly (1, 2, 3, 4) in its adjusted position. A single manually operated lever (32) is operable to lock and release the locking means.

12 Claims, 2 Drawing Figures

APPARATUS FOR VERTICAL AND AXIAL ADJUSTMENT OF A STEERING WHEEL

TECHNICAL FIELD

This invention relates to an apparatus for vertical and axial adjustment of the position of a steering wheel assembly of an off-highway motor vehicle, such as may be used in agricultural or construction work, which has a steering wheel with a steering shaft extending into a hydraulic steering control. More particularly, this invention relates to an apparatus permitting the steering wheel, steering shaft and hydraulic steering control assembly to be moved axially in the direction of the steering shaft and to be swiveled about a horizontal axis upon operation of a manual lever.

BACKGROUND OF THE INVENTION

Theretofore, apparatus has been suggested for the vertical and axial adjustment of a steering wheel which can be manipulated with a single manually operated lever. This prior apparatus has a clamp which snugly surrounds the steering column and can be braced by means of a device which can be manipulated with the manual lever. A longitudinal key arranged along the steering column, which locks into a keyway of the clamp, serves to prevent twisting. The clamp has a flexible connection with a console secured to the vehicle and clamp rings, and friction rings are inserted into the connection so as to improve its locking capacity. With this known apparatus, a great deal of space is needed for swiveling the hydraulic steering control connected to the lower end of the steering column because the swivel axis is rather high on the steering column.

Additionally, the various parts of this prior apparatus must fit very precisely in order to achieve a good simultaneous clamping effect by all components upon moving the manual lever so as to secure the steering wheel assembly in a desired position. This prior apparatus is very expensive and requires the use of a steering column which is not in general commercial use.

OBJECTS AND SUMMARY OF THE INVENTION

The general object of this invention is to provide an adjustable steering wheel assembly which is extremely compact and which uses inexpensive and easily manufactured components.

It is a further object to provide an adjustable mounting for a steering wheel assembly which permits selective adjustment on the axis of the steering wheel and adjustment about a horizontal axis through operation of a single manual lever.

The objects of this invention are achieved by mounting the steering wheel assembly on aligned pivots on its opposite sides which extend through slots in parallel upstanding support plates extending generally parallel to the steering wheel axis and by the provision of slotted adjustment links pivotally connected to opposite sides of the steering assembly by horizontally aligned pins spaced above the aligned pivots and a manually operated clamping bolt extending through the slots in the links and through aligned openings in the support plates together with friction elements which permit sliding and pivoting of the links on the clamping bolt. By placing the pivots and pins on laterally opposite sides of the hydraulic steering control unit of the steering assembly, all of the components of the apparatus are close to each other in the area of the hydraulic steering control unit, and, thus, an extremely compact design is achieved. In addition to this, most of the components of the apparatus can be manufactured easily and inexpensively as simple cast or stamped parts.

In the preferred embodiment of the invention, an inverted U-shaped bracket is secured to the hydraulic steering control unit. The aligned pivots are mounted on the lower ends of the flanges of the U-shaped bracket disposed along opposite lateral sides of the steering control unit and the pivot pins for the slotted adjustment links are secured to points on the flanges of the U-shaped bracket near the web interconnecting the flanges.

The apparatus of this invention may incorporate a vehicle mounted support which is U-shaped with its interconnecting web secured to the vehicle and its upright flanges or plates extending upward on laterally outer sides of the flanges of the U-shaped bracket. Preferably, the clamping bolt extends through aligned openings in the plates in vertically spaced relation to the lower pivots and is operated by a single manual lever on one of its opposite ends. In order to achieve a strong clamping effect, a plurality of side-by-side slotted links may be used at opposite lateral sides of the steering assembly together with interposed friction discs or washers through which the clamping bolt extends.

Also, a pair of tension springs may be interconnected between the steering assembly support on the vehicle and the adjustable steering assembly so as to at least partially support the weight thereof.

BRIEF DESCRIPTION OF THE DRAWINGS

One embodiment of the invention is illustrated in the drawings in which.

DETAILED DESCRIPTION OF THE DRAWINGS

Figure 1:
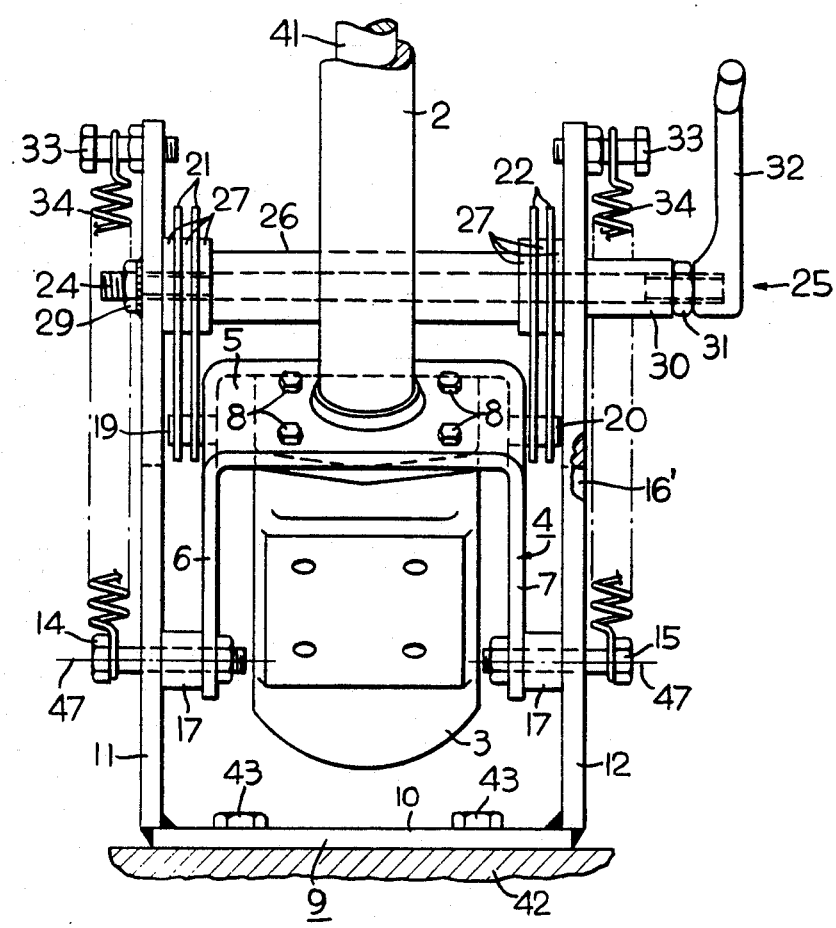
FIG. 1 is a front view of an adjustable apparatus for a steering assembly with parts broken away for illustration purposes.
Figure 2:
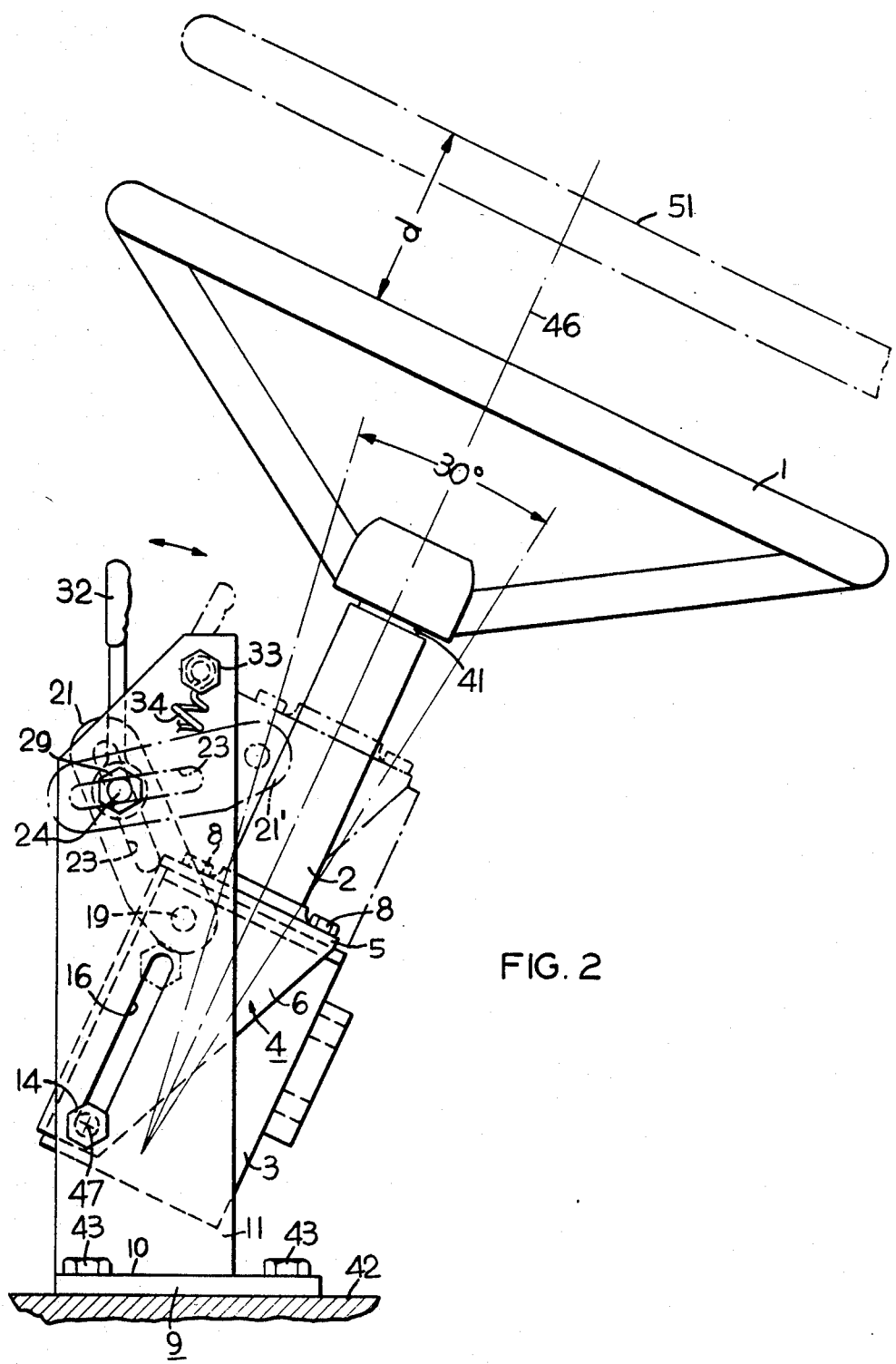
FIG. 2 is a side view of the apparatus shown in FIG. 1.

Referring to FIGS. 1 and 2, a steering wheel 1 includes a shaft 41 which extends downwardly through a steering column 2 and which is connected at its lower end to a hydraulic steering control unit 3. The steering control unit 3 is connected hydraulically to hydraulic steering cylinders, not shown, by pressure hoses, not shown. An inverted U-shaped bracket 4 has a web 5 with an opening through which the steering column 2 extends and vertical flanges 6 and 7 which extend downwardly at right angles to the web 5 on opposite lateral sides of the hydraulic steering control unit 3, which is fastened to the web 5 by means of cap screws 8. Thus, the hydraulic control unit 3 is supported on and disposed within the U-shaped bracket 4 which is downwardly open. The U-shaped bracket 4 is mounted on a U-shaped support 9 which has flanges or parallel flat plates 11 and 12 extending upwardly from a web or base 10, which is secured to the vehicle frame 42 by cap screws 43. The plates 11 and 12 are parallel to and are disposed in outboard relation to the flanges 6 and 7 of the bracket 4. The flanges 6, 7 of the bracket 4 are supported at their lower ends by aligned pivot pin means in the form of bolts 14, 15 which extend through aligned openings in the flanges 6, 7 and through long slots 16, 16' in the plates 11, 12. The slots 16, 16' extend upwardly in the direction of the steering column 2 and are substantially parallel to the axis 46 of the steering wheel 1. Spacer bushings 17 are positioned on the bolts 14 and 15 between the flanges 6, 7 of the bracket 4 and the corresponding plates 11 and 12 of the support 9. A pair of aligned pivot elements in the form of pins 19, 20 are anchored to the flanges 6, 7 in vertically spaced relation to the bolts 14, 15 and near the web 5. The pins 19, 20 pivotally connect the flanges 6, 7 to the corresponding ends of two pairs of parallel slotted adjustment links 21, 22 which are in side-by-side spaced relation to one another and extend in a general fore and aft direction diverse to the slots 16. The adjustment links 21, 22 have horizontally aligned slots 23 elongated in the longitudinal dimension of the links 21, 22. A clamping bolt 24 of a manually operated friction device 25 slidingly extends through the slots 23. The bolt 24 is threaded on each end and extends through the aligned openings in the upper portions of the plates 11, 12. A spacer bushing 26 is placed on the central portion of the bolt 24 and friction elements or washers 27 are arranged between the individual links 21, 22 as well as between the links and the plates 11, 12 and between the links and the spacer bushing 26. The threaded end of the bolt 24 which projects through the plate 11 of the bracket 9 threadedly engages a threaded part or nut 29 which is welded to the plate 11. A manual lever 32 is threaded onto the threaded end of the bolt 24 and is secured against rotation by a lock nut 31. The end of the bolt 24 extending through the plate 12 carries a spacer bushing 30 between the plate 12 and the lock nut 31.

Bolts 33 are anchored to the outboard side of the upper end of both plates 11, 12 of the support 9 so as to serve as anchors for the upper ends of a pair of helical tension springs 34 whose lower ends are connected to the pivot bolts 14, 15.

By pivoting the manual lever 32 in a clockwise or counterclockwise rotative direction, as viewed in FIG. 2, the clamping mechanism 25 is tightened or loosened, in which conditions the friction washers 21, 22 are compressed or are free to turn. As shown in FIG. 2, when the clamping mechanism 25 is in a loosened or released condition, the steering assembly, consisting of parts 1, 2, 3 and 4, can be adjusted axially the distance d to its maximum axially raised position shown by broken lines 51 and can be pivoted about the common axis 47 of pivot bolts 14, 15 approximately 30 degrees. When the clamping bolt 24 is loosened, the tension springs 34 support almost all the weight of the steering assembly thus facilitating adjusting it to the desired position. When clamping mechanism 25 is tightened or locked, the plates 11, 12 of the support 9 are pulled toward one another thus pushing the spacer bushings 17 against the flanges 6 and 7 of the U-shaped bracket 4 so that any looseness and resultant noise that might otherwise develop at these pivot bolt connections is reduced or avoided.

The steering wheel assembly adjustment apparatus of this invention is compact due to the manner in which it is releasably supported on the pair of upstanding plates 11, 12 at the laterally opposite sides of the hydraulic control unit 3. By using a pin and slot connection between the plates 11, 12 and the lower end of the steering assembly and by using slotted adjustment links 21, 22 between higher points on the steering assembly and the plates 11, 12, a stable but adjustable mounting for the steering assembly is achieved. The links 21, 22 may pivot between the solid line position to a position shown by broken lines 20' shown in FIG. 2 when the steering assembly is adjusted axially the maximum amount. The slotted links 21, 22 also permit pivotal adjustment of the steering assembly about the common horizontal axis 47 of pivot bolts 14, 15 upon release of the clamping mechanism 25.

The embodiments of the invention in which an exclusive property or privilege is claimed are defined as follows:

1. Apparatus for vertical and axial adjustment of the position of a motor vehicle steering wheel having a steering shaft extending directly into a hydraulic steering control unit, said apparatus comprising:

a U-shaped bracket rigidly secured to said hydraulic control unit and presenting parallel flanges along opposite lateral sides thereof, a support adapted for rigid attachment to a vehicle including a pair of upstanding plates parallel to and on the outboard sides of said flanges, a pair of slots in said plates, respectively, elongated in a direction parallel to the axis of said steering shaft, a pair of aligned pivot pin means secured to said flanges, respectively, and extending into said slots, respectively, a pair of spaced elongated links on the inboard sides of said plates having first corresponding ends pivotally connected to the outboard sides of said flanges, respectively, on an axis parallel to and spaced above the axis of said pivot pin means and having second corresponding ends presenting slotted openings elongated in the general direction of elongation of said links, said general direction being diverse to said axis of said steering shaft, and locking means operable to releasably secure said links to said plates including, a generally horizontal clamping bolt mounted on said plates in vertically spaced relation to said slots and extending through said slotted openings in said links and means carried on said clamping bolt presenting friction surfaces in confronting relation to said links and to the laterally inner sides of said plates, and a manually operable lever connected to said clamping bolt, said plates being drawn toward one another whereby said links are frictionally secured to said plates when said lever is pivoted in one rotative direction and said links being released from said plates when said lever is pivoted in an opposite rotative direction to said one rotative direction.

2. The apparatus of claim 1, wherein the upper ends of said flanges of said U-shaped bracket are interconnected by a web rigidly secured to said steering control unit and said flanges extend vertically downward alongside opposite lateral sides of said steering control unit, wherein said pair of pivot pin means are a pair of pivot bolts secured to the lower ends of said flanges, respectively, and wherein said links are pivotally connected to said flanges by a pair of pivot elements secured to the upper ends of said flanges.

3. The apparatus of claim 1 wherein said means for releasably locking said links to said plates includes a threaded part on one of said plates, wherein said clamping bolt includes threads on one end in threaded engagement with said threaded part of said one plate and wherein said manual lever is secured for rotation with the other end of said clamping bolt.

4. The apparatus of claim 1 wherein a plurality of parallel elongated links are pivotally connected to the upper end of each flange and present horizontally aligned slots through which said clamping bolt extends.

5. The apparatus of claim 4 wherein said means for releasably locking said links to said plates includes friction elements between the portions of said links in which said slots are formed.

6. The apparatus of claim 5 wherein said locking means for releasably securing said links to said plates includes friction elements between said links and said plates and wherein said friction elements each includes an opening through which said clamping bolt extends.

7. The apparatus of claim 1 and further comprising a pair of tension springs having corresponding upper ends anchored on the upper end of said plates and having corresponding lower ends anchored to said U-shaped bracket whereby said steering control unit is at least in part resiliently supported when said locking means are released.

8. Apparatus for vertical and axial adjustment of the position of a motor vehicle steering wheel having a steering shaft extending directly into a hydraulic steering control unit, said apparatus comprising:
   a support adapted for rigid attachment to a vehicle including a pair of upstanding plates parallel to and on the outboard sides of said control unit,
   a pair of slots in said plates, respectively, elongated in a direction parallel to the axis of said steering shaft,
   a pair of aligned pivot pin means connected to said control unit, respectively, and extending into said slots, respectively,
   a pair of spaced elongated links on the inboard sides of said plates having first corresponding ends pivotally connected to laterally opposite sides of said control unit, respectively, on an axis parallel to and spaced above the axis of said pivot pin means and having second corresponding ends presenting slotted openings elongated in the direction of elongation of said links, said links being elongated in a direction diverse to said slots, and
   releasable clamping means for frictionally securing said links to said plates including
   a generally horizontal clamping bolt mounted on said plates in vertically spaced relation to said slots and extending through said slotted openings in said links and
   a manually operable lever connected to said clamping bolt, said links being frictionally secured to said plates when said lever is pivoted in one rotative direction and said links being released from said plates when said lever is pivoted in a rotative direction opposite to said one rotative direction.

9. The apparatus of claim 8 wherein said releasable clamping means includes a threaded part on one of said plates, wherein said clamping bolt includes threads on one end in threaded engagement with said threaded part of said one plate and wherein said manual lever is secured for rotation with the other end of said bolt.

10. The apparatus of claim 8 and further comprising tension spring means interconnecting said control unit and said support and operable to at least partially to support said control unit when said clamping means is released.

11. The apparatus of claim 8 wherein a spacer bushing is coaxially disposed on an intermediate portion of said clamping bolt and between said links and wherein friction washers are disposed on said clamping bolt between said plates and said links and between said links and axially opposite ends of said bushing.

12. The apparatus of claim 11 wherein said releasable clamping means includes a threaded part on one of said plates, wherein one end of said clamping bolt is in threaded engagement with said threaded part and wherein said lever is secured for rotation with the other end of said clamping bolt.

* * * * *